E. H. KELLEY.
FEEDING MECHANISM FOR VENDING MACHINES.
APPLICATION FILED DEC. 3, 1910.

1,265,788.

Patented May 14, 1918.
6 SHEETS—SHEET 1.

WITNESSES

INVENTOR:
Elias H. Kelley.
By Chas. M. C. Chapman
ATTORNEY

E. H. KELLEY.
FEEDING MECHANISM FOR VENDING MACHINES.
APPLICATION FILED DEC. 3, 1910.
1,265,788.
Patented May 14, 1918.
6 SHEETS—SHEET 2.
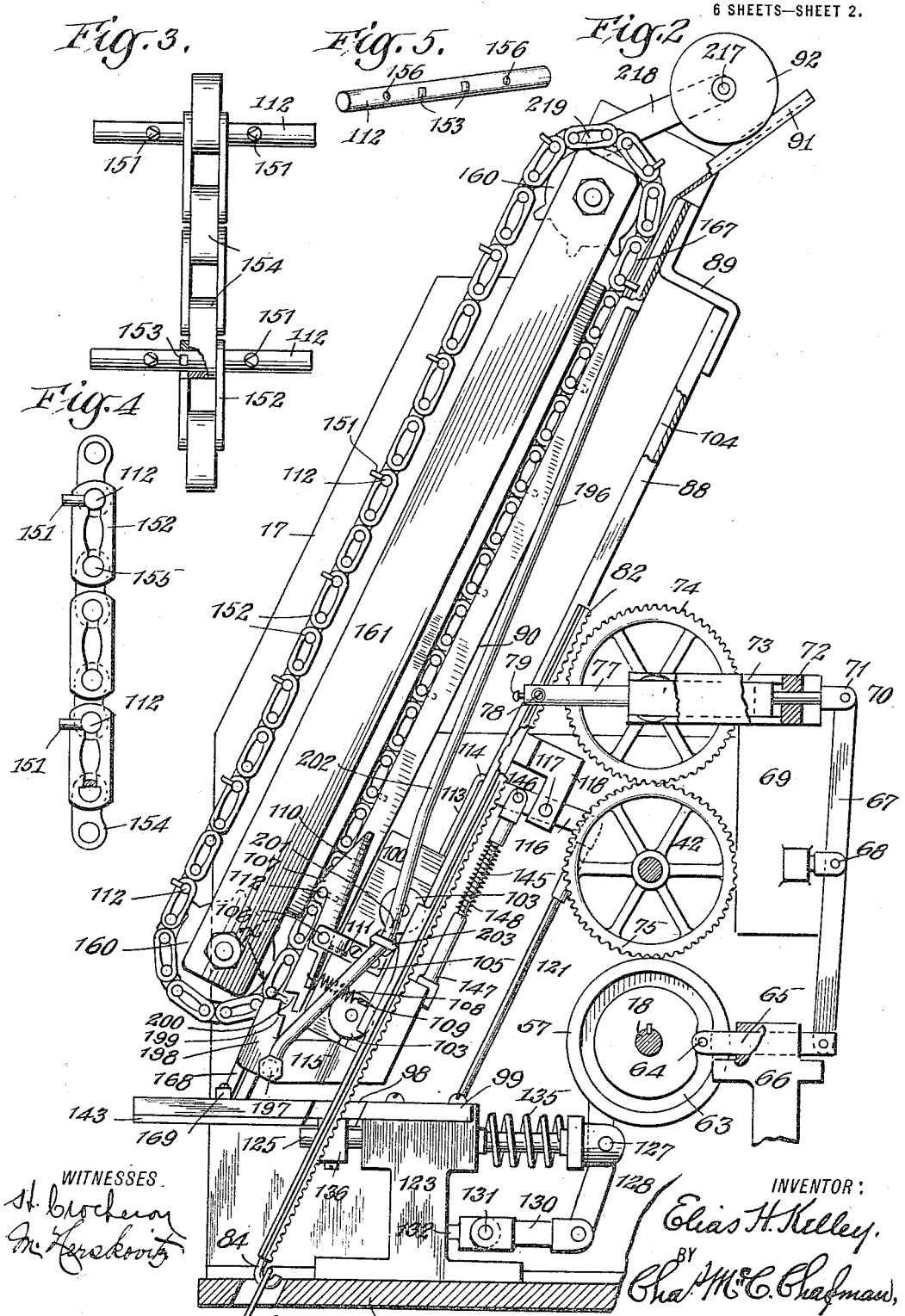
INVENTOR:
Elias H. Kelley.
BY
Chas. M.C. Chapman,
ATTORNEY.

E. H. KELLEY.
FEEDING MECHANISM FOR VENDING MACHINES.
APPLICATION FILED DEC. 3, 1910.
1,265,788.
Patented May 14, 1918.
6 SHEETS—SHEET 3.
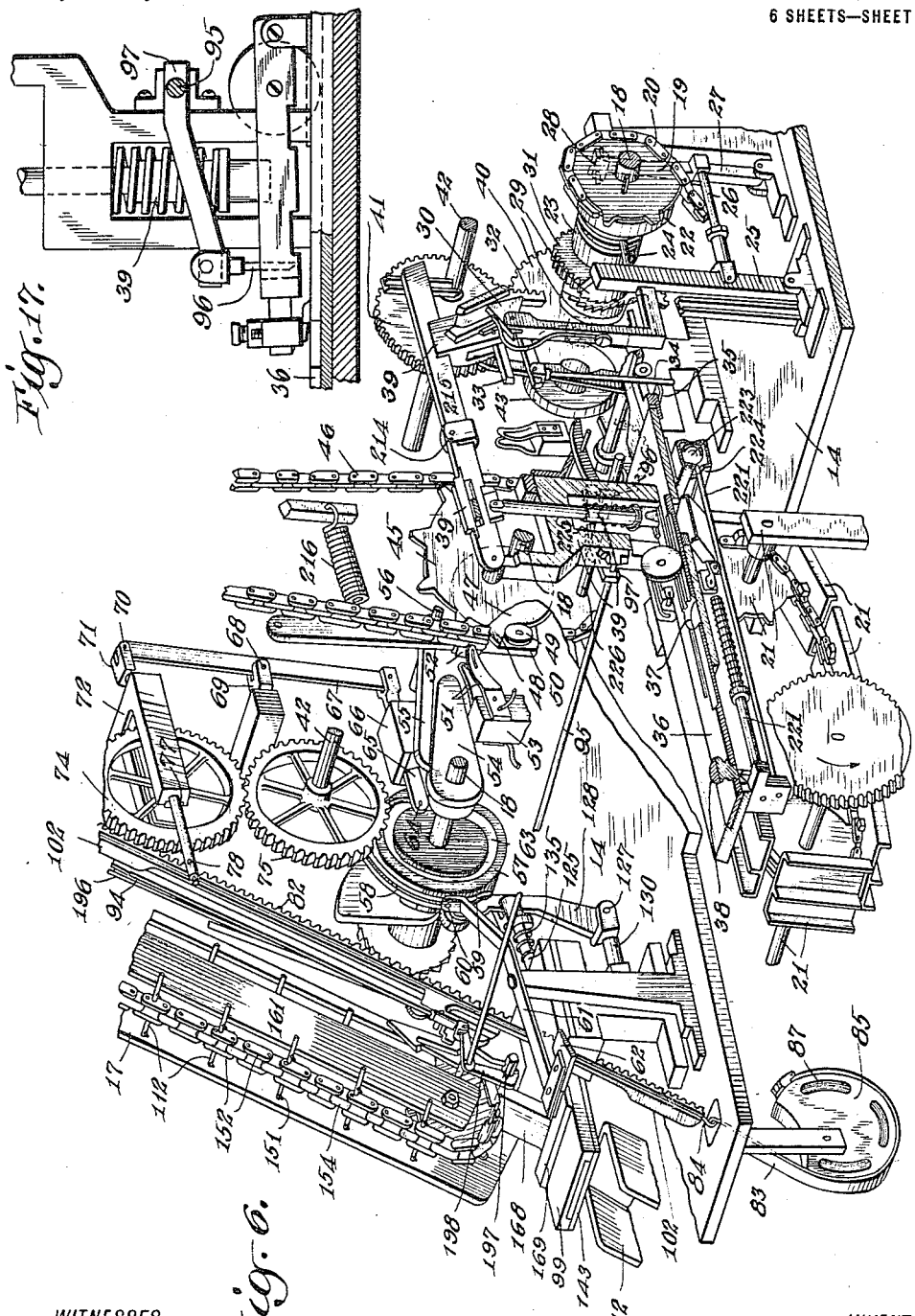
WITNESSES
INVENTOR:
Elias H. Kelley.
BY
Chas. McC. Chapman
ATTORNEY

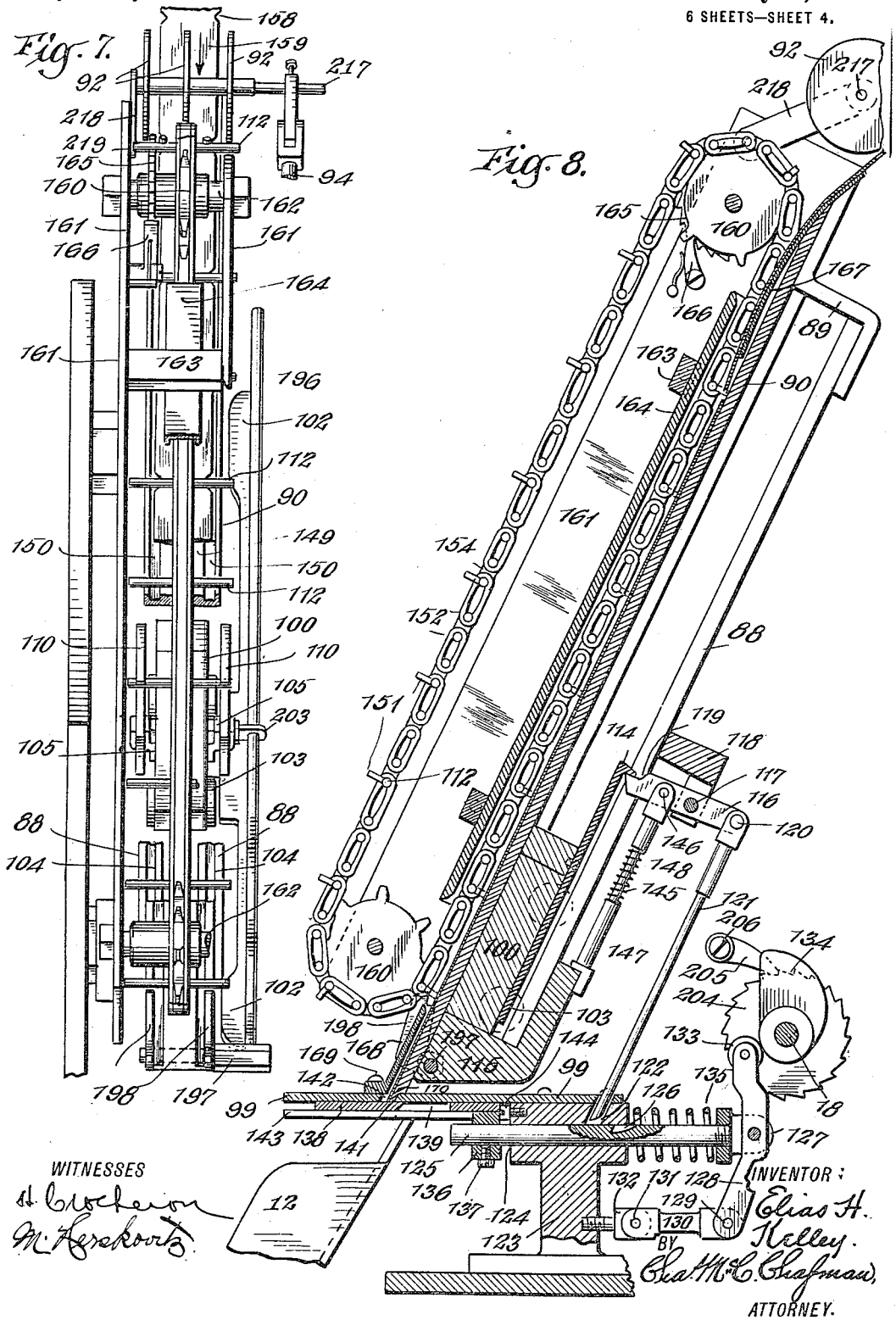

E. H. KELLEY.
FEEDING MECHANISM FOR VENDING MACHINES.
APPLICATION FILED DEC. 3, 1910.
1,265,788.
Patented May 14, 1918.
6 SHEETS—SHEET 5.
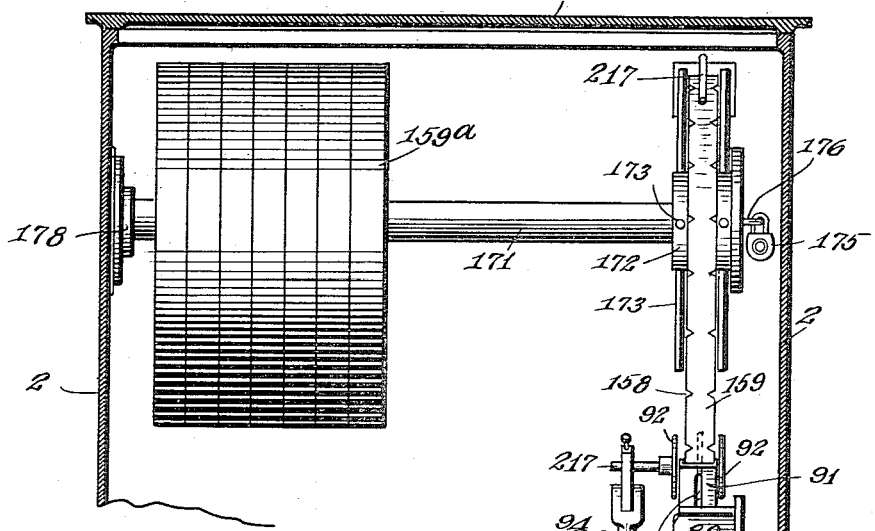
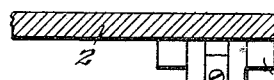
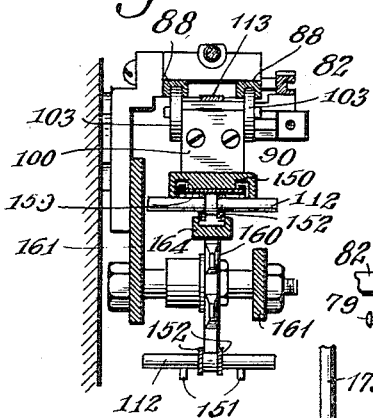
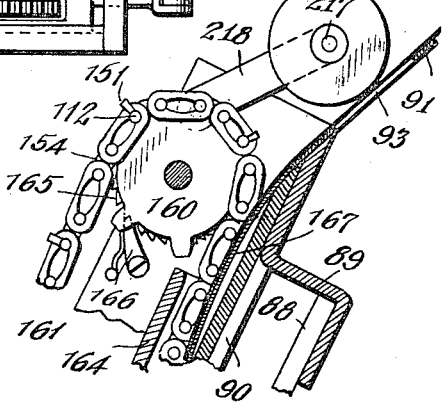
WITNESSES
INVENTOR:
Elias H. Kelley.
BY
Chas. McC. Chapman,
ATTORNEY.

E. H. KELLEY.
FEEDING MECHANISM FOR VENDING MACHINES.
APPLICATION FILED DEC. 3, 1910.
1,265,788.
Patented May 14, 1918.
6 SHEETS—SHEET 6.
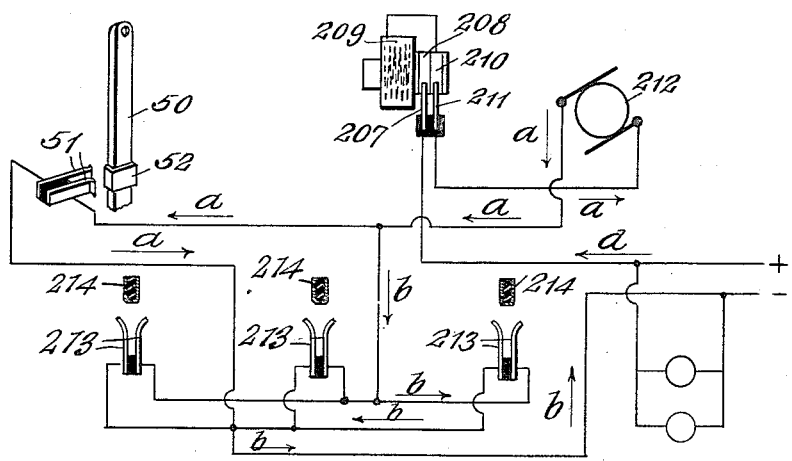
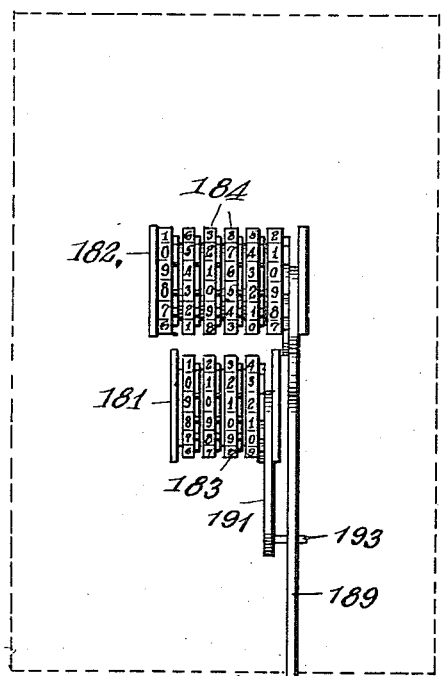
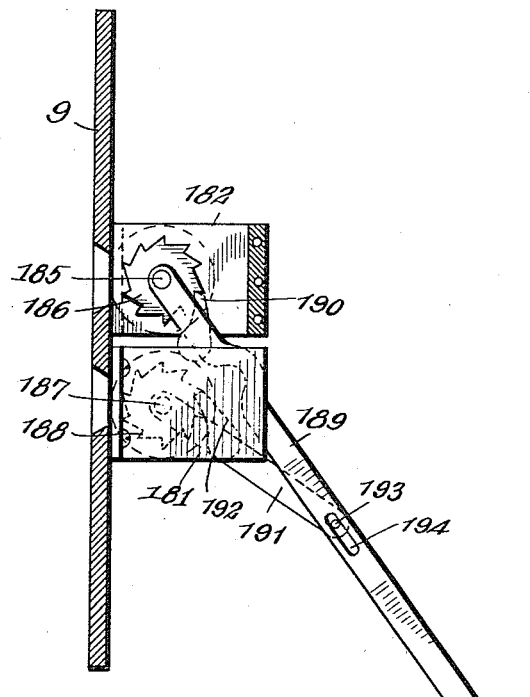
WITNESSES
INVENTOR
Elias H. Kelley,
BY
Chas. McC. Chapman
ATTORNEY

UNITED STATES PATENT OFFICE.

ELIAS H. KELLEY, OF NEW YORK, N. Y.

FEEDING MECHANISM FOR VENDING-MACHINES.

1,265,788.  Specification of Letters Patent.  Patented May 14, 1918.

Original application filed December 17, 1909, Serial No. 536,638. Divided and this application filed December 3, 1910. Serial No. 595,339.

*To all whom it may concern:*

Be it known that I, ELIAS H. KELLEY, a citizen of the United States, residing in the borough of Manhattan, city, county, and State of New York, have invented a new and useful Improvement in Feeding Mechanism for Vending-Machines, of which the following is a description.

This invention has reference to vending machines and, particularly, to feeding mechanism for the coin-controlled apparatus capable of vending or delivering one or a plurality of articles as may be desired according to the coin deposited; and this invention has been divided from my application filed December 17, 1909, #533,638, in which latter said feeding mechanism is shown embodied in a machine demonstrating its efficacy for feeding and delivering flat articles from a web or continuous strip in reel form.

Among the objects of my invention may be noted the following: to provide a feeding mechanism capable of delivering one or more articles according to a predetermined rule of action imposed upon the mechanism; to provide a feeding mechanism which, when it has performed its delivery function, will be locked against any further movement until its controlling mechanism is brought into action; to provide a feeding mechanism which operates positively upon and controls the article to be delivered and yet does not penetrate nor in any manner deface said article; to provide means by which feed movements or deliveries can be counted or registered; to provide means for supporting the reel of articles, prevent its removal from the machine and properly present the strip to the feeding mechanism; to provide means by which a web of articles may be supported, fed for delivery, controlled in its movements during the feeding action, the articles cut from the web in any desired number, and each article counted as it is delivered; and to provide certain details of construction, arrangements of parts, and combinations of elements for securing accuracy, positiveness and effectiveness in operation, as will be fully set forth and claimed.

With the above objects in view and others which will be detailed during the course of this description, my invention will be clearly understood from the following description and drawings, in which latter:

Fig. 2 is an enlarged view showing in elevation and section the feed-chain, controlling means, and other associated parts;

Fig. 3 is an elevation of a portion of the feed-chains, a part being broken away;

Fig. 4 is a side elevation of Fig. 3;

Fig. 5 is a perspective view of one of the feed-pins;

Fig. 6 is a perspective view of certain parts of the machine, the view being made by breaking out certain parts;

Fig. 7 is a front elevation, with parts broken away, of the feeding chain and chute;

Fig. 8 is a longitudinal section taken beside the feed-chain, showing details of the feeding and cutting mechanisms;

Fig. 9 is a rear elevation of the top of the machine showing the reel support, locking device and guiding means;

Fig. 10 is a sectional elevation of a detail;

Fig. 11 is a top plan and partial section of a portion of the controlling mechanism;

Fig. 12 is an enlarged view of the top of the feeding and guiding means, certain of the parts being in section and others in elevation;

Fig. 13 is an enlarged sectional detail showing the locking means for the reel;

Fig. 14 is a front elevation of the counter;

Fig. 15 is an elevation partly in section of the construction shown in Fig. 14; and Fig. 16 is a diagram showing the leads of the electric circuit.

Fig. 17 shows a detail.

Figure 1:
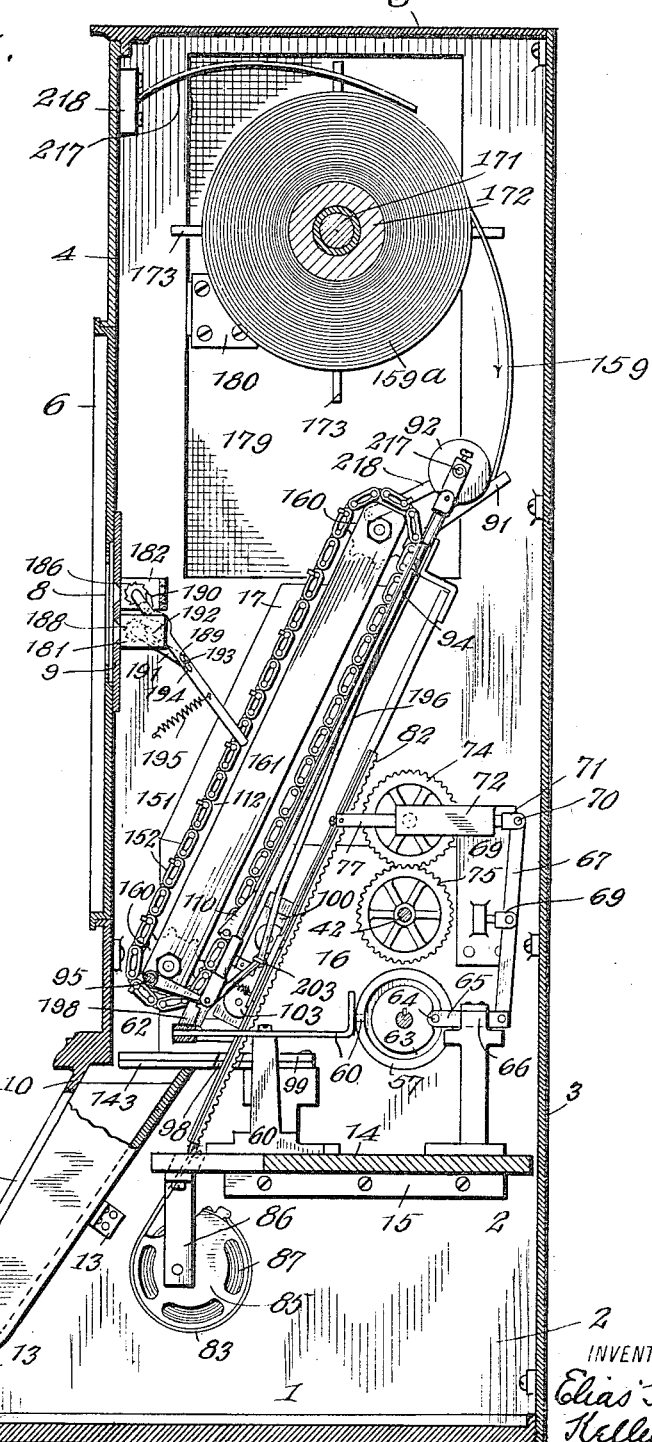
Figure 1 is a vertical section taken substantially centrally of the machine from front to rear.

Referring to the drawings, the numeral 1 indicates the base of the frame, 2 a side-plate, 3 the back-plate, 4 the front-plate and 5 the top-plate, these parts being fitted and bolted together by coöperating ears and lugs so as to provide a rigid and strong supporting frame. The front-plate is provided with a door 6, on which any desirable indicia may be placed and through which the mechanism can be reached. The door is provided with an opening 8, back of which is set a dial 9, forming part of a counting and registering device of any approved construction modified according to my invention as will be set forth in regular order. The frame is provided with a short, inclined chute-extension 10, the face of which is slotted as at 11, and behind which slot the delivery chute 12 is supported upon the brackets 13, as shown in Fig. 1. In rear of the chute a mid-plate 14 is supported upon the side-bars 15, fixed to the side 2 of the frame, this mid-plate having the function of sustaining practically all of the driving parts of the machine, and being removable from the frame together with all the parts carried thereby. The mid-plate 14 has secured to it a side journal-plate 16 extending vertically and having an upward inclined portion 17.

The mode of operation of my invention will be better understood, primarily, by reference to Fig. 6 wherein the essentials of the machine are shown; that is to say, it should be understood that the operation of the feeding mechanism, for a functional purpose, depends, in my particular machine, upon the movement and operation of certain trains of mechanism under the influence of a given good coin, and the amount of feed-movement being dependent upon the value of the coin. In other words, the web of articles is supported, controlled, fed and a certain number cut off and delivered, according to conditions in the coin-slide, and in order that the feeding or delivery mechanism may be understood, the unit mechanism of Fig. 6 will be explained. In this figure when the main-shaft 18 is started by either motor or crank, the sprocket-wheel 19 will be rotated, the same being fixed to the shaft in any usual way, such rotation driving the sprocket-chain 20 which drives a coin-conveyer mechanism, the parts of which are indicated by 21, further reference to which is unnecessary since it forms no part of my present invention, said mechanism merely receiving the coins deposited in the machine and taking care of them in the manner clearly set forth in my parent application, above referred to. Next to the sprocket-wheel 19 on the driving-shaft 18 is fixed a disk 22, said disk having a flange provided with a slot 23 which coöperates with the pin 24 carried by the lever 25, said lever being connected by the adjustable rod 26 with another lever 27 having at its upper end a head 28 provided with a pair of pins for certain functional purposes not necessary to describe here. The function of this mechanism may be stated, generally, to be to shift a clutch-device consisting of two members 29, so that the driving-shaft 18 may actuate a certain mechanism carried by said shaft to be presently referred to. The clutch-device is actuated by a trip mechanism, the parts of which are generally indicated by 30 and to which no detailed reference will here be made since such details form no part of my present invention. Next to the grooved part of the cylinder is the mutilated gear 31 which coöperates with the rack 32 of the angular tripping lever 33 suitably guided in the machine, said tripping lever having pivotally connected to it the trip-rod 34 which coöperates with a ledge 35 fixed to the frame of the machine and from which ledge said trip-rod is shifted by the rearward movement of the coin-slide 36. The coin-slide is provided with a coin-receiving aperture 37 and is manipulated by hand, the knob 38 being provided for the purpose. A coin placed in the aperture 37 of the coin-slide will, in my machine of my parent application, undergo several tests including test for magnetic material, a test for diameter, a test for thickness and a test for tensile strength, these several tests being imposed successively as the coin is moved rearwardly by the coin-slide. The tensile strength testing mechanism is generally indicated by 39; and as the coin in the slide has this test imposed upon it, and if the coin be a good one, the machine is set in operation by the rear end of the coin-slide striking the trip-rod 34 and setting the trip mechanism 30 into operation which will cause the closing of the clutch members 29 so as to drive the feeding mechanism, as presently described. The farther clutch member 29, which is fixed to the driving-shaft 18, is formed in the hub of a gear 40 free to rotate on the driving-shaft 18, but fixed against longitudinal movement on the driving-shaft, and meshing with the gear 41 fixed to the feed-shaft 42 arranged above the driving-shaft and journaled in suitable pairs; these two gears 40 and 41 have a ratio, in this particular invention, of 1 to 8, for the delivery, by the feeding mechanism of five tickets in a web or strip and at a single feed movement of the machine, as will be presently fully explained. A stop or buffer cam 43 is fixed to the hub extension of the gear 40 and coöperates with the buffer-pin 44 shown in proper position in dotted lines, said cam and pin being for the purpose of stopping the driving-shaft 18 after each complete rotation, said buffer-pin being shifted laterally by suitable mechanism for the purpose of allowing the driving-shaft to have rotary movement, all as clearly set forth in my said parent application. In the latter application the parts just described and which actually constitute the elements of a "unit" coin-slide mechanism are duplicated so as to enable the machine to deliver either two tickets for a ten cent piece or one ticket for a five cent piece, as will be readily understood. Farther along on the shaft 18 and beyond certain of the duplicated devices a sprocket-wheel 45 is fixed, the same being driven by the sprocket-chain 46 from a counter-shaft and motor driven mechanism of any suitable type, but shown in my parent application as an electric motor and magnetic clutch device. Farther along on the shaft 18 is the disk 47 having the peripheral cam 48 coöperating with the anti-friction roll 49 carried by a releasing lever 50 fulcrumed at its upper end to any suitable fixed part of the machine, this lever being normally held in coöperation with said cam in any suitable way. The lever 50 coöperates with a pair of spring fingers 51 forming electrical contacts for coöperation with the contact-plate 52 carried by said lever, the contact fingers being supported by the post 53 secured in any suitable manner to the plate 14. Still farther along on the shaft 18 a radial arm 54 is fixed, the same coöperating with the arm 55 carried by the rock-shaft 56 suitably journaled in bearings in the machine, these elements forming part of a coin-slide retrieving device, the details of which are not necessary to be described herein since they form no part of my present invention, but in connection with which it may be said that after the coin-slide has been forced to its rearward extreme and has performed its necessary functions of tripping the machine into operation, said slide is positively started on its return movement by the said retrieving mechanism, just referred to.

Next to the arm 54 on the shaft 18 is the disk 57 provided with the peripheral groove 58 having the cam-jog 59 coöperating with the pin 60 carried by the lever 61 connected at its forward end to a throat-plate 62 which latter coöperates with the coin-slide 36 for the purpose of passing the coin to the conveyer mechanism 21. The details of this throat-plate mechanism are not herein further described since it forms no part of my present invention. The cam-disk 57 is also provided in its right face with a cam-groove 63 in which runs a pin 64 carried at one end of a slide-bar 65 guided in the top of a standard 66 and confined to longitudinal reciprocations therein, said bar being pivotally connected at its rear end to the lower end of the lever 67 fulcrumed midway between its ends at 68 to a suitable supporting-plate 69 and, at its upper end, being pivotally connected at 70, see particularly Fig. 2, to the rear end of a slide bar 71 guided in the head 72 of the supporting-plate 69 in which head said bar is confined to longitudinal reciprocations. The bar 71 at its forward end is forked, see Fig. 11, as shown at 73, and in the forward end of the prongs of said fork has a gear-wheel 74 journaled, said gear-wheel meshing with the gear-wheel 75 carried by the shaft 42, the said gear wheels 74 and 75 having a ratio of 1 to 1. The head 72 of the supporting-plate 69 has an extension 77 projecting toward the front of the machine and provided at its forward end with an adjustable pin or screw 78 held in fixed position by a screw 79 and the forward end of which is provided with an anti-friction roll or pin 80 operating in a longitudinal groove 81 in a reciprocating rack-bar 82, the teeth of which coöperate with the gear-wheel 74 when the latter has moved forward to produce such coöperation by means of the lever 67. The rack-bar 82 is inclined from front to rear of the machine, see Figs. 1, 2 and 6, and is of a length to extend from the plate 14 to substantially the top of the gear 74, and is normally held in its lowermost position, as shown in Figs. 2 and 6, by means of a strap 83 the free end of which is looped over a hook 84 on the lower end of said rack-bar, the other end of the strap being connected to the drum 85 journaled in the hanger 86 secured to the plate 14. Said drum 85 is under control of the spring 87, the form of which is substantially the same as the main spring of a clock. The tension of the spring 87 may be adjusted in any suitable way, the means adopted by me being such as shown in my aforesaid parent application and consisting of a pawl and ratchet mechanism, and a crank being provided for manipulating the spring to adjust the tension.

Tracks 88 are provided which are connected by means of the angle-plate 89, secured at its top to the top-plate 90 and at its bottom to the two said tracks 88. The top-plate 90 forms the bottom of the ticket-feed chute, which at its top, is extended vertically at an angle to said top-plate, as at 91, and which extended portion coöperates with the disks 92 of the ticket-feelers. The central disk of the feeler is arranged midway of the chute extension 91 directly over a longitudinal slot 93 in the latter, while the other two disks of the feeler are arranged at opposite sides of said chute extension. The central disk of the feeler, in the absence of tickets, will drop into the longitudinal slot 93, thus permitting the rod 94 to drop, which will turn the rock-shaft 95, resulting in depressing the stop-finger 96 on arm 97 into position such that the coin-slide will be prevented from moving forward by coöperation of its end with said finger. The rack-bar 82 operates in a slot 98 in the cutter-frame 99 and is rigidly held in its operative path by the pin 78 and by the feed car 100 to which it is rigidly connected by web 101. The rack-bar is also steadied and guided in its movements by the lugs 102, at top and bottom thereof, which run in contact with the adjacent track-bar. The feed-car is composed of a solid and very heavy piece of metal and has journaled to it at opposite ends a pair of anti-friction rollers 103, running in the grooves 104 of the bars 88, see Figs. 2, 7 and 10. The car has secured to each of its sides a bracket-piece 105, on which a catch is pivoted at 106, said catch having near its upper end a hook 107. At its lower end or tail-piece said catch has a coiled-spring 108 connected to it, the other end of which is connected to a fixed part of said car, as at 109. The catch being under spring-control, normally stands in the operative position shown in Fig. 2. The upper end of said catch is given a wedge or tri-angular form as at 110, the hook 107 being formed at the base of the triangle. A stop-screw 111 is set in the bracket-piece 105, so as to have its forward end project into engagement with the tail-piece of said catch to limit its movements in that direction, thus preventing its upper end 110 from being thrown too far forward, the object being to cause the hook of the catch to always ride in contact with but under or in rear of the pins 112 of the feed-chain. Otherwise, the hook 107 might run between the pins and interfere with the feed of the chain. The upper end of the car 100 has extending from it a rigid arm 113, the upper end of which is formed into a hook 114, this hooked arm traveling between the track-bars 88 and having its hook traversing a path slightly below the upper surface of said bars, as shown in Fig. 8. In its position of rest upon the bottom 115 of the track, the car 100 has its arm 113 in coöperation with a lever 116 pivoted at 117 to a bracket 118, fixed to the bars 88, the coöperating end of said lever being formed into a catch-depression 119 to receive the hook 114 of said arm 113. The rear end of lever 116 has pivoted to it at 120, the upper end of a rod 121, the lower end of which plays in the inclined aperture 122, in the cutter-frame 99 and standard 123, said aperture being intersected by a transverse bore 124 in the upper end of said standard 123. A rod 125 slides in the bore 124, said rod having a depression or opening 126 between its ends for the reception of the lower end of the rod 121. The lower end of rod 121 is beveled from one side to the other, and the depression 126 in the rod 125 is correspondingly formed, viz., with its rear wall inclined upwardly; and said depression is made larger than the end of the rod 121 so as to insure the entrance thereof into said depression. The rear end of the rod 125 has a forked collar 127 secured thereto, to which is pivoted the lever 128, the lower end of which is fulcrumed at 129 to the rear end of a link 130, the front end of which is pivoted at 131 to a lug 132 secured to the standard 123. The upper end of the lever 128 carries an anti-friction roll 133 which coöperates with a cam 134 on the driving-shaft 13, this cam being set on said shaft next to the cam-disk 57. A coiled-spring 135 surrounds the rod 125 and has one end in engagement with a nut, which can be adjusted to regulate the strength of the spring, and the other in engagement with the standard 123, see Fig. 8. The normal tendency of the spring 135 is to force the roller on the end of lever 128 into engagement with the cam 134 and tend to withdraw the depression 126 in rod 125 from the path of movement of the vertical rod 121. The forward end of rod 125 has secured to it a knife-holder 136 by means of a screw 137, said holder being adjustable on said rod. The knife-blade 138 is secured in any suitable way to the holder 136 and extends forward to the front of the machine, said blade having a transverse slot 139 therein for the passage of the tickets to be cut off the web and delivered to the operator. The cutting-edge of the blade 138 is formed at 140 by beveling the front wall of the slot 139, said cutting-edge coöperating with the beveled edge 141 of the rear wall of a transverse slot 142 in the cutter-frame 99 directly under the lower or delivery end of the chute formed by the top-plate 90 of the cutter-frame. The cutting-blade 138 is normally held out of operation and under spring-tension, but ready for work, by the coöperation of the lower end of the rod 121 with the depression 126 in the rod 125, the release of the latter rod by lifting the rod 121 enabling the spring to move the cutting-blade 138 across the ledger-blade 141 and sever one or more tickets from the web. The cutting-blade is supported also by the plate 143 forming the bottom of the cutter-frame within which it is guided and steadied in its action. The rearward or cutting movement of the cutter is limited by a stop-screw 144 set in the standard 123 just in rear of the holder 136. The rod 121 is limited in its action by a buffer consisting of a rod 145 pivoted at 146 to the lever 116, said rod sliding in a tube or socket 147 fixed at its lower end to the base 115. A spring 148 surrounds said rod 145 and bears at one end against said tube 147 and at its other end on an enlargement of the rod 145. Hence, the normal tendency is to hold the rod 121 in position to enter the opening 126 in rod 125 and this buffer takes the shock of the blow delivered by the hook 114 in the descent of the car 100. This buffer-device also operates to prevent the rod 121 from being thrown from the aperture 122, thus keeping said rod in coöperative relation with said rod 125. The device also quiets the blow of the car upon the base 115 at the end of a feed movement.

The trough 12 is situated directly beneath the delivery slot 142 in the cutter-frame 99 so as to receive the article severed by the cutter. The top-plate 90 forming part of the ticket-chute, has its upper surface formed into a central ledge 149, see Figs. 7 and 10, along which the ticket web is fed. The surface of said plate 90 is also provided, along opposite sides of the ledge 149 with grooves 150 for the reception of the pins 151 carried by the laterally extending pivot-pins 112 which hold together the several link-plates 152 of the feed-chain; that is to say, the feed-chain shown in Figs. 3, 4 or 5 is composed of the link-plates 152 arranged in pairs, one end of which is provided with an aperture through which the pivot-pin 112 extends. The edges of the link-plates 152 coöperate with the angular notches 153 of the pivot-pin 112, the link-plates and pins being thus prevented from having relative lateral movement. A link-bar 154 connects at adjacent ends two pairs of link-plates 152, the connection being made by pins 155. According to my invention every other pair of link-plates 152 is connected to a link-bar 154 by means of an extended pivot-pin 112. Each pivot-pin is also provided with apertures 156 in which are set the feed-pins 151 which in cross-section are made substantially triangular, as shown in Fig. 3, with the vertices toward each other. These feed-pins 151 coöperate with notches 158 in the web of articles 159, see Figs. 7 and 9, said notches being formed to correspond substantially to the shape of said pins, and the said pins being spaced apart on the pivot-pins 112 the exact distance necessary to fit snugly in the said notches 158. The pins 151 are made just long enough to extend below the surface of the web 159 and travel within the grooves 150 of the top-plate 90 so as to obtain a substantial hold upon the web for feeding the same along the ledge 149. In consequence, as the feed-chain travels along the ledge in contact with the web 159 the latter is fed positively and uniformly in the direction of the arrow, Figs. 1 and 7, and when the pins reach the lower one of the sprocket-wheels 160 said pins will be lifted away from the web and lose their feeding engagement therewith. The sprocket-wheels are journaled at opposite ends of the frame 161 upon the pins 162, as clearly shown in Fig. 7; the said frame being composed of two like plates. Secured to the top-plate 90 by means of bars or brackets 163 is a chain-guard 164, see Figs. 7 and 8, which extends between the two sprocket-wheels 160, said chain-guard lying close to the upper surface of that portion of the chain which is feeding the web 159 between said sprocket-wheels. The shaft or journal of the upper sprocket-wheel 160 carries between the latter and the adjacent side-bar 161 a ratchet-wheel 165 under control of a spring-pawl 166 secured to said side-bar 161, said pawl preventing reverse movement of the feed-chain and sprocket-wheels and any back-lash which might otherwise occur in the operation of the machine. The teeth of the ratchet-wheel 165 are very fine or close together. In order to make the engagement of the feed-pins 151 with the notches 158 of the web absolutely certain, I have provided at the top of the feed-chute and directly under the feed-chain adjacent the upper sprocket-wheel 160 a bowed or convexed plate 167, see Fig. 12, extending approximately from the extension plate 91 to a position below the upper end of the chain guard 164. The length of this convexed plate 167 which may be accurately set and made of rigid material, or may be made of resilient material, is caused to accord substantially with the distance the feed-pins 151 might travel without engaging the notches 158 in the web, if said plate were not interposed at this point. The provision of the plate, however, causes the web to rise into contact with the chain and thus bring the two into such intimate relation that the feed-pins are compelled to enter accurately into the notches of the web and practically up to their connection with the pivot-pins 112. This prevents any possibility of the feed-pins from only partially engaging the web and slipping therefrom or missing the same entirely as the said pins leave the sprocket-wheel at the upper end of the feed-chute. I consider this an important feature of my invention and lay stress upon it because by its use the accurate and positive feeding of the web is insured. At the lower end of the feed-chute below the lower sprocket-wheel I have provided a plate 168 connected by means of its flange and screw 169 to the cutter-frame 99 adjacent the ticket slot 142, the object of this plate being to properly direct the lower end of the web, from which one or more tickets are to be cut into the said slot 142 and also to prevent said end of the web from springing out of place. This plate continues the feed-chute at this point and operates as a cover for the latter to guard against displacement of the severed end of the web. For the same purpose and reasons, the bottom 115 of the feed-chute is either extended or provided with a lug or projection 170 located opposite the plate 168 and extending into the slot of the cutter-frame, so as to form the back of and complete the passage for the web 159 in the said slot 142. The provision of these two parts 168 and 170 make certain the direction of the web into the slot 142 and to the cutter and prevents any possibility of the end of said web springing or curling out of place or taking a wrong direction.

The web 159 is wound in cylindrical form, as shown in Figs. 1 and 9, and a number of these web cylinders 159$^a$ can be held in reserve upon the supporting-bar 171 near the top of the machine-frame. When one of these web-cylinders is required for use it is slid laterally upon the bar and centered upon the spool 172 journaled upon said bar 171, see Fig. 1, and when in this position the flanges of the spool will hold the said web-cylinder from lateral movement. The spool 172 may be provided with a series of radial pins 173, screwed into the periphery of the spool and removable for the purpose of allowing the web-cylinders to be set upon the spool without removing the latter from the machine. To restrain the spool 172 from lateral movement longitudinally of the supporting-bar 171, I have provided the latter near its free end with a circumferential groove 174, see Fig. 13, into which certain of the pins 173 may be extended by screwing the same sufficiently far down to provide the connection. The pins thus coöperating with the said groove 174 are the ones extending through the inner edge of the spool 172. By removing the pins 173 at this side of the spool, the latter can be slid along the supporting-bar 171 to remove the same, for any purpose desired, after the lock 175 has been removed from the holding-loop 176 to release the holding-plate 177 and when said pins 173 are in place, as shown in Fig. 13, the spool is set in the proper position without possibility of longitudinal movement on supporting-bar 171, which is fixed in the bearings 178, at one side of the frame, and extends to near the other side, at which point the said frame is provided with a door 179 hinged thereto and which may be held locked by a spring-catch 180, see Fig. 1. The web 159 may be a single strip of material, and each section between the pairs of notches 158 may be consecutively numbered and be printed for tickets suitable for subways, street-cars, or other purposes. Or said web may be composed of strips of material secured together at predetermined points leaving open spaces or pockets between the securing points in which stamps or other flat articles may be inserted. In fact, my machine is capable of feeding flat articles in web form and wound upon a reel of any character, kind or description either in single, double or other strips, as may be desired. When formed double or made into pockets, each pocket may have an opening or mouth through which to fill the same, this being all clearly set forth in my said parent application.

As shown in Figs. 1, 14 and 15, a counter is supported on the door or face-plate 6 of the machine, the dial-plate of which is indicated at 9 and is of the type known as odometers and is only conventionally shown. The supporting brackets of the counter are indicated at 181 and 182. The device consists of two counting-cylinders 183 and 184 of usual construction both of which register or count each and every article delivered from the machine. The lower cylinder 183 is provided with a trip mechanism which enables it to be returned to zero after it has counted the deliveries from a complete web-cylinder. I have provided the shaft 185 of the upper counting-member 184 with a ratchet-wheel 186 having ten teeth corresponding to the number of figures in each circle of numbers of the said member, and the shaft 187 of the lower counter-member 183 is provided with a like ratchet-wheel 188. The shaft 185 has a lever 189 journaled thereon, carrying a pawl 190 and connected to a link 191, the upper end of which is journaled upon the shaft 187. The link 191 carries the pawl 192, the two pawls 190 and 192 coöperating, respectively, with the ratchet-wheels 186 and 188. A pin 193 carried by the lower end of the link 191 rides in a slot 194 in the lever 189. The lever 189 projects into the path of movement of the extended pivots 112 of the feed-chain, said lever being held in a normal operative position by means of the spring 195 connected at one end to the frame of the machine and at the other end to said lever, the latter being thus held so as to be tripped into action by each and every pivot-pin 112 which passes. Every complete reciprocation of the lever registers a number on the counter and each number thus registered indicates a ticket delivered from the machine, since the distance between such extended pivot-pins 112 of the feed-chain is the exact length of a ticket between the notch 158 of said web. No claim is herein made to the structure or form of counter or odometer; but, my invention, in this construction, resides in the means whereby said odometer is adapted to perform the several important functions in my machine. Said means or mechanism combined with the odometer and the relation of said mechanism to the feed-chain of the delivery mechanism is the important feature of this part of my invention and upon it I desire to lay stress, it being understood that the upper member of the counter is caused to register the total number of articles delivered from the machine irrespective of the number of webs which may be exhausted in the machine, while the lower member of the counter is for the purpose of registering the total number of articles delivered from the particular web in operative position in the machine. The arrangement of the two counters is such that the upper member cannot be reached or tampered with, and the numbers thereon are made to correspond with the numbers of successive articles in the webs which may be numbered consecutively. The lower member of the counter, however, can be manipulated so as to reset the same, as before suggested, at zero after the numerals have been exhausted, or the articles in a given roll have become exhausted.

Extending alongside of the feed-frame is a rod 196, see Figs. 2, 6 and 7, the lower end of which is connected to the journal-pin 197, working in the bottom-plate 115, said pin having connected to it a duplex-catch composed of similar arms 198, carried by and extending vertically therefrom, said pin being operated by the rod 196. The upper end of each of the arms 198 is provided with a notch 199, coöperating with a like notch 200, in the lower end of the top-plate 90. The arms 198 form a duplex-catch. The rod 196, near its lower end, is provided with the spread V-shaped portion 201, the upper leg of which forms an angle 202, with its upper end, which is free. The car 100 is provided with the slide 203, running upon said rod 196, for the purpose of actuating the same according to the position said car may be in; that is to say, in the position shown in Fig. 2, the slide 203 coöperates with the vertex of the V-shaped portion 201, of said rod, and has, in this position, rocked the same upon its journal 197, so as to throw the duplex-catch outwardly. The upward travel of the slide of the car on the rod 196 causes the latter to rock in the opposite direction, which will throw the duplex-catch 198 inwardly into coöperation with the notched lower end 200 of the top-plate 90, thus bringing the two notched portions 199 and 200 into coöperation. In the above position, shown in Fig. 2, a laterally-extending pivot-pin 112 is in engagement with the top of the duplex-catch 198, on both sides of the feed-chute. But, when the car 100 is in an upper position, ready for feeding the web, said duplex-catch will have been moved inwardly out of the path of travel of said chain-pins; hence, as the car descends, the chain can feed along normally until the angle 202 is reached; that is to say, the operation of the duplex-catch takes place according to the position of the slide 203, on the rod, from the angle 202 to the vertex of the V-shaped portion 201. In other words, in the upward travel of the car, the slide 203, combined with the angle of the upper leg of the V-shaped member 201, will cause the duplex-catch to be moved to the closed position with its notch 199 in coöperation with the notch 200, of the top-plate 90, and this closed position will be maintained from the time the said slide 203 passes the angle 202, from which point or time the duplex-catch is held in an inoperative position, permitting the pivot-pins 112 of the feed-chain to freely pass. This action is true, likewise, on the downward movement of the car and until the slide 203 reaches the said angle 202, from which moment the duplex-catch will be moved outwardly toward the position shown in Fig. 2, which position it assumes and maintains simultaneously with the stopping of the car at the lower extreme of its movement. At this moment the pivot-pins 112 of the feed-chain will engage the upper ends of the duplex-catch 198 and the feed movement of the chain will be instantly stopped and no further feed movement will be possible until the duplex-catch is again moved rearwardly, as before described.

The driving-shaft 18, at its extreme left end, Figs. 6 and 8, is provided with a ratchet-wheel 204, fixed thereto in any suitable way so as to rotate with it, and coöperating with said ratchet-wheel is a pawl 205, journaled upon a pin or stud 206, extending from the side-support 16. The pawl engages the ratchet-wheel by gravity though, obviously, it may be depressed by a spring, and operates always in engagement with said ratchet-wheel to prevent any back movement being imparted to the driving-shaft 18. This is an important element in my machine, since it prevents the operator, if using the hand-crank, from reversing the machine and thereby putting certain of the mechanism, including the feeding, or delivery mechanism, out of condition or "jamming" the machine in some other way. This device insures the proper forward rotation of the driving-shaft and delivery operations under any condition.

As previously stated, I may drive my machine by the hand-crank, by an ordinary treadle, or by a motor, and by the latter term I purpose including any mechanical motor whether driven by spring, compressed air, steam, or otherwise, and also an electric motor. I have found it, however, in practice satisfactory to employ an electric motor, as set forth in my said parent application, it not being necessary, however, to show a motor in this case except diagrammatically, as in Fig. 16.

Assuming the source of power, indicated by the positive sign +, the current will traverse the lead $a$ to that one of the brushes 207 which coöperates with the slip-ring 208 near the magnetic clutch-member 209 and passing through the latter will, by the proper lead, go to the slip-ring 210 and its coöperating brush 211 nearer to the motor 212 through which it passes, and still following the lead $a$ will run to the first one of the contact-members 51 with which the switch-bar 50 coöperates, these contact-members being insulated from and supported by the bracket-piece 53 secured to the plate 14 of the machine. At this point the current cannot pass in the normal condition of the machine and can only pass when the contact-member 52 is in coöperative relation with the spring-contacts 51 to close the circuit. Hence, the current will pass by way of the lead $b$ to, for example, the twenty-five cent slide on the extreme right of the machine and will run to the outer one of the contact-members 213 which, if the contact-device 214 of the lever 215 of the tensile strength testing mechanism be in coöperative relation with said spring-contacts 213, will pass the current by way of the lead $b$ through to the source of power as indicated by the negative sign —. This completes a circuit and thereby drives the sprocket-chain 46 and the driving-shaft 18 and the clutch-members 29 will be brought into driving connection, thus imparting rotary movement to the feed-gears 40 and 41 and the feed-shaft 42 resulting in a functional operation, such as the delivery, in this instance, of five tickets from the web 159. During the rotation of the driving-shaft the cam 47 will coöperate with the anti-friction roll 49 carried by the switch-bar 50, thus forcing the contact-member 52 between the two contacts 51, and substantially at the same time, the mutilated-gear 31 will coöperate with the rack 32 of the angular tripping-lever 43, thus lifting the lever 215 and breaking the circuit through the contact-members 213 and 214. This breaking of the circuit in the lead $b$ taking place just after the lead $a$ is closed between the contact-members 51 and 52 results in shunting the current along lead $a$, the latter to the lead $b$ and to the negative side of the main or generator. By causing the circuit at 213 to take place just after the closing of the circuit at 51, sparking is eliminated and the operation of the machine is rendered continuous. The passing of the cam-portion 48 from the roller 49 permits the spring 216 to take control of the switch-bar 50 and thus withdrawing its contact 52 from the contact 51, and breaking circuit $a$ and stopping the machine, this action taking place at the end of a complete rotation of the driving-shaft, which produces, under the influence of a good coin of the proper denomination, a complete feed movement of the feed-chain and the severing and delivery of the proper number of tickets into the chute 12.

It has been pointed out that, in the rapid operation of the feed-chain, as in feeding five tickets at a time, and owing to the inertia of the web, when first used, the latter is caused to spin and loosen quite a stretch of the web on the cylinder. While this has never occurred to an objectionable degree, I consider it important to provide means for preventing the occurrence. Hence, a brake 217, see Figs. 1 and 9, is fastened to the front-plate 4 or any other suitable portion of the machine-frame by a bracket or piece 218 said brake consisting of a spring-plate to impose pressure upon the periphery of the web and exert enough tension thereunder to prevent the same from delivery except under the pull of the feed-chain or equal stress.

The foregoing description has been given in connection with the single coin-slide mechanism in conjunction with all the other essentials of my vending machine of "unit" type; that is to say, though it has been assumed throughout the description that the machine is to vend or deliver one, two or five articles, for convenience the coin-slide mechanism, located and adapted for delivering five articles, or articles representing in value twenty-five cents has been described. And it should be borne in mind that this coin-slide mechanism or "unit" can be duplicated indefinitely in a gang-machine without duplicating any of the web manipulating or other feeding and delivery mechanism essentials for carrying out the functions of the said unit. With these facts in mind and with the foregoing detailed description, the following mode of operation will be readily understood with reference to Figs. 1, 2, 6 and 16:

Assuming a source of electric current, the machine at rest and in readiness for the delivery of one or more articles, as the case may be, and assuming a good coin of the proper denomination, viz., a twenty-five cent piece, inserted in the coin-aperture 37 of the coin-slide 36, the operator will push said slide inwardly or toward the rear of the machine by means of the handle or knob 38, whereupon the coin will undergo in succession the several tests for magnetic material, thickness and tensile strength. Also since the feelers 92 are in engagement with the web the stop-finger controlled thereby will be held from interference with the movement of the coin-slide. The coin being a good one and no obstruction being presented to the coin-slide, the operator will be able to force said slide to its rearward extreme of movement causing the rear end of said slide to engage with the trip-rod 34 of the tripping mechanism and drive it from its seat at 35. The tripping mechanism being thus set in operation, the lever 215 will be dropped so that its contact-member 214 will coöperate with the contacts 213 and other parts of the machine will be set in position preparatory to performing their respective fuctions. The contact being made at 213 the lead $a$ is closed across the contacts 213—214 through the medium of the leads $b$, the magnetic-clutch 209 will be set in operation, the motor 212 will be set in operation, the sprocket-chain 46 will be driven, thus rotating the driving-shaft 18 through the medium of the sprocket-wheel 45. The driving-shaft being thus rotated the various elements and devices carried thereby are caused to produce in one cycle of movement of said shaft the following action of the feeding mechanism: The shaft in the cam-groove 63 in the side of the disk 57 will operate upon the pin 64 and move the bar 65 longitudinally, said bar in turn vibrating the lever 67 which will move the slide 73 forward, thus moving forward the gear 74 which is always in mesh with the gear 75 and also rides over the top of the latter. Engagement of the gear 74 with the upper end of the rack-bar 82 is thus brought about, said rack-bar being connected to the feed-car 100, thus bringing about an operative relation between these and coöperating elements of the feeding mechanism. Shortly after this operation the jog in the peripheral cam-groove 58 of the disk 57 will actuate the lever 60 and move the throat-plate 62 so as to allow the coin in the aperture 37 of the coin-slide under the pressure of the ram of the tensile strength testing mechanism to be dropped into the chute and thence to the cups of the conveyer 21, the coin being subsequently carried to the coin-box, all as set forth in my said parent application. The clutch parts 29 having been brought into coöperation the feed-gear 40 will be driven, thus driving the coöperating gear 41 and actuating the feed-shaft 42 and the gear 75 fixed to the outer end thereof. Said gear 75 will thus drive the gear 74 now in mesh with the rack-bar 82 connected to the feed-car 100, thus causing said car to run up the tracks 88 and assume a position suitable for the engagement of its catches 107 with the opposite ends of a pin 112 of the feed-chain and sufficiently high to enable the proper length of the movement to be given to said chain to deliver five tickets from the web 159. At the same time the feed-car 100 was elevated, the lever 116 was released by the catch 114, thus permitting the spring 148 to swing said lever on its fulcrum through the medium of the rod 145, this swinging of the lever driving the locking-rod 121 downwardly so as to enter the aperture 126 in the cutter-rod 125 which, at the same time, was being operated upon by the lever 128, the anti-friction roll 133 of which coöperates with the cam 134 on the driving-shaft 18, the operation of said cam upon said lever forcing the said rod 125 forward, thus moving the cutter-plate 138 to its extreme or forward movement, in which position it is set by the coöperation of the said rod 121 with the aperture 126. This movement of the cutting-blade causes the compression of the spring 135 resulting in storing power therein preparatory to a cutting operation presently to take place. Successively the coin-slide is returned to its original position, the tripping mechanism is recocked by seating the rod 34 upon the rest 35 and the tensile strength testing mechanism is returned to its normal position, thus breaking the contact between 214 and 213 this occurring substantially at the end of about three-quarters of the rotation of the driving-shaft. Just before the said contacts are separated to break the circuit, the lead $a$ is completed by the shifting of the contact-bar 50 so as to enter the contact 52 between the contacts 51, this being accomplished by the cam 47 carried by the driving-shaft operating upon the roll 49. This movement of the switch-bar 50 extends to spring 216, thus storing power therein to enable it to return said bar to an inoperative position at the proper time to break the lead $a$. As the trip mechanism is reset, as stated, the buffer post 44 is in position to engage the cover-cam 43 so as to bring the driving-shaft to a stop at the completion of a single rotation. During the last one-tenth, substantially, of the rotation of the driving-shaft the clutch mechanism is opened, thus preventing any further feed movement being given to the shaft 42 during the medium of the coöperating gears 40 and 41 and the coöperating gears 74 and 75; electric circuit is broken by the separation of the contact-devices 51 and 52, the spring 216 operating to return the lever 50 to its normal position; and the main-shaft becomes locked by the buffer-cam 43. Also during the latter portion of the rotation of the driving-shaft the cam-disk 57 has been rotated to a position such that the jog in the cam-groove 63 will ride into coöperation with the pin 64, resulting in reversing the movement of the lever 67 and withdrawing the gear 74 from the rack-bar 82. The moment this action takes place, which is coincident with the locking of the driving-shaft, the feed-car 100 descends thus causing the hooks 107 to engage the extended pivot-pins 112 of the feed-chain, which are immediately thereunder. The weight of the car coupled with the impulse given the same by the tension-spring 87 connected to the rack-bar 82 causes said car to rapidly descend, thus imparting a rapid feed movement to the feed-chain, the feeding-pins 151 in the grooves 150 being in coöperation with the notches 158 of the web, resulting in the delivery of the articles corresponding to the amount of feed movement given, which is dependent upon the coin-slide mechanism, which may be in operation. As the feed-car descends, or substantially at the time it reaches its lower limit of movement, the hook 114 carried by the bar 113 coöperates with the lever 116, thus lifting the locking-rod 121 and permitting the power of the spring 135 to drive the cutting-blade 138 into coöperation with the ledger-blade 141, thus severing the web at this point for the delivery of the article, the latter dropping by gravity, after being thus severed by the web into the chute 12 where the operator can obtain the same. Also during the descent of the feed-car 100 the rod 196 is actuated by the slide 203 in coöperation therewith, acting upon the V-shaped portion 201, the beginning of such action being at or about the angle 202 and the action of said slide upon the rod being to press the same forward and thus rock the duplex-stop 198 upon its journal 197 so as to present the upper ends of the said duplex-stop in position to be engaged by the extended pivot-pins 112 of the feed-chain, which are next directly above said ends, thus preventing said feed-chain from being given any further feed movement. Back-lash or reverse movement of the feed-chain is prevented by the pawl and ratchet device 166—165. Thus after a delivery is made by the feeding and cutting mechanism, just described, a further feed movement of any degree is absolutely prevented and the feed-chain, which has entire control of the web of articles, is maintained at rest until the feed-car is again elevated preparatory for another feed movement; and the duplex-stop is not moved out of coöperative relation with the feed-chain, as just described, until the slide of the feed-car passes the angle 201 of the rod 196. During the feeding movement of the feed-chain, the pins on the stretch thereof, opposite that portion which is feeding the web, engaging the extended lever 189 of the counting mechanism; that is to say, just to the extent that the feed-chain is driven by the feed-car and just to the number of pins that indicate the number of deliveries by said feed-chain, so, on the opposite stretch of the latter, a corresponding number of pins will pass the lever 189 and successively operate the same, which, through link 191 and pawls 181 and 191 will drive the ratchets 188 and 186 a corresponding number of teeth, the spring 195 coöperating with the lever to impart the requisite number of reciprocations for registering the number of deliveries from the web. Hence, it will be understood that, for every article delivered, one pair of feed-pins 157 passes a given point indicated by the arrow x, Fig. 2, and for every pair of pins that pass such point a pin of one of the pairs will engage and operate the counter-lever 189, the spring 195 instantly returning said lever to position to be engaged by the next pin passing in the same direction; also, that for every movement of the lever 189 both ratchet-wheels of the counting mechanism are moved to the extent of one tooth, thus turning the shafts of the two counting members one degree or number of their counting wheels.

At the time the gear 74 is moved from engagement with the rack-bar 82, as just described, the driving-shaft has completed its cycle of movement, or single rotation. From the foregoing, it will be understood that the machine is at rest with power stored in the material testing device, with the tripping mechanism reset ready for a further operation, the clutch parts 29 separated and the driving-shaft held from rotation, all the other parts of the machine being in position ready for the repetition of a functional operation; and it should be understood at this point that the foregoing description is that of any one of the coin-slide mechanisms or "unit," heretofore referred to, in combination with the other essentials going to make up my vending machine, as just given, is wholly with reference to a good coin of the proper denomination inserted in the coin-slide which is constructed and gaged, as to its coin-receiving aperture for the reception of such coin.

Another important device comes into play when the web of connected articles, being severed from the machine, fails for any reason, such as when the web becomes exhausted or torn, or separated in any way, whereby the continuity of the web is broken at the entry end of the feed-chute, composed of the disks 92 journaled upon the short shaft 217 carried by the arm 218 pivoted at one side of the feed-chute, as at 219, and supported in the position shown in Figs. 1, 2 and 12, by reason of its central disk bearing substantially centrally upon the web 159 as it is fed in the feed-chute and directly above the slot 93 in the extension 91 thereof. In this position, the rod 94 is held so as to lift the crank-arm carried by one end of the rock-shaft 95 which near its opposite end carries the arm 97 provided with the stop-finger 96 which normally stands, in this condition of parts, above and out of possible contact with the rear end of the coin-slide 36. If for any reason, as previously suggested, the articles or the web, should fail and the central disk of the feeler should fall within the slot of the feed-chute extension, the rod connected to the end of the shaft supporting said disk would immediately drop and thereby depress the arm connected to the end of the rock-shaft 95, which, in turn, would depress the arm carrying the pivoted finger 96, which latter would immediately drop into position so as to engage the cam-projection 36ª of the coin-slide. With this condition of the parts, the coin-slide cannot be forced inwardly, since the cam-projection will engage the depending finger and the latter, being pivoted, will swing a short distance rearwardly and engage a stop and thus hold the coin-slide against further rearward movement. This condition may exist either by reason of the fact that the web of articles at the entry end of the feed-chute has become exhausted before a functional operation is attempted, or even after a functional operation has been produced by the complete movement of the slide, and then, for some reason, the article or web has become exhausted, as previously stated. Should this latter occur, the depending finger will immediately drop to its proper position, but as the slide is at its rearward extreme, or the cam-projection 36ᵃ is at some point in rear of said finger, as the slide is moved back to its normal position, the cam-projection thereof will slide past the depending-finger 96 by reason of the fact of its being pivoted and no impediment is presented to its operation in that direction, as clearly indicated in Fig. 17. The cam-projection of the slide having thus passed the finger, the latter will immediately swing to its normal vertical position in the path of travel of the said cam-projection, thus presenting a stop to the rearward movement of the coin-slide, under any circumstance, as above suggested. In consequence, even though a coin be deposited in the coin-slide in preparation for a functional operation of the machine, the foregoing operation will take place since the depending-finger will engage the cam-projection and stop the movement of the coin-slide prior to the coin in the coin-slide passing into coöperation with the gage-disk 220 of the thickness gaging means. Hence, though a coin has been deposited in the coin-slide, there will be no feed action and the coin may be recovered by the operator because the slide will return to its normal position where the coin can be taken from the slide. This mechanism is also of great importance as a means by which to positively lock the machine against a functional or feeding operation at any time, even though the machine be full of tickets, since the rod 94 can be disconnected at either end so as to permit the depending-finger 96 to drop down into its functional position and thus lock the coin-slide against rearward movement. This is a great advantage at times when an owner desires to put the machine out of action and leave it for any purpose. The feeler, by being provided with the three disks, shown in Fig. 7, can be always maintained in its proper operative position, since the two outer disks coöperate with the feed-chute extension and operate as a guide and retainer to hold said feeler in its proper position and steady it in its operations.

From the foregoing it will be apparent that when the web of articles fails, for any reason, the feeding mechanism cannot be brought into operation for any purpose since the coin-slide cannot be operated to actuate the trip mechanism and start the machine into operation, as has been described. This is an important feature of my invention and upon it I desire to lay stress since the absence of the web 159 at any time from the feed-chute which would prevent the delivery of an article from the machine would immediately be detected and if the coin-slide were not located as described the machine would take the money of the operator without delivering an article for it. Hence, the feeler and its actuating mechanism becomes a positive lock for the feed or against a feeding action to prevent the delivery mechanism of the machine performing any operation, functional or otherwise, in the event there be no web or article to be delivered properly disposed in coöperative relation with the feeding mechanism.

By numbering the tickets consecutively which numbering will be made to correspond with the numbering in the counter, and by placing a number of web-cylinders in storage in the machine, as shown in Fig. 9, the owner or operator of a given machine can prevent loss of tickets, or mistake in resetting the machine, since a great number of rolls of articles, consecutively numbered, can be placed in proper sequence in storage in the machine, which rolls or cylinders will be moved in regular order into position for delivery from the machine. By this means, the user of the machine can, through his inspectors, have an infallible check upon his employees both against their mistakes and their dishonesty.

It should now be understood that, in order to produce the proper feed or delivery of articles in proportion, or in corresponding value, to the different coins to be used in the respective units, differential gears, which will control the proportional feed, must be provided. In order that the differential gears controlling the feed and delivery of articles may be under the control, respectively, of the coin-slide units, and yet be arranged compactly in a gang-machine, I have mounted the gear 40 on the driving-shaft 18 which coöperates with the gears 41 on the feed-shaft 42. The gear on the shaft 42 is fixed thereto, while the gear on the main-shaft 18 is loose thereon and is brought into coöperation only by the clutch-rings or circles of teeth 29. Hence, a given differential feed-gear, when brought into operation through said clutch-rings, will control the feed of the articles by rotating the shaft 42 which, nevertheless, by reason of the gear 41 being fixed thereto, will also drive its complemental gear on the driving-shaft, but without function, since the latter is free to run on said shaft because the clutch-members are not in operative engagement. It is important, therefore, that not more than one pair of clutch-devices 29 shall be in coöperative relation at one time during any given cycle of the machine or rotation of the driving-shaft, in a gang-machine, and as the clutch-mechanism is dependent for its operations upon the operation of the coin-slide mechanism, a means has been provided by which to prevent the operation of more than one coin-slide mechanism at a time. This means consists of the addition to each coin-slide of a rod 221, in parallelism with the rod 222 so located as to enter between the balls 223 contained in the holder 224 when the coin-slide is pushed in. Since the carrier is so proportioned as to receive just the number of balls necessary to provide between any two of them space sufficient only for the reception or passage of one rod 221, it is obvious that only one rod and, consequently, only one slide 36 at a time can be forced rearwardly for a functional operation of the machine, and any attempt to force more than one slide at a time, or to force one slide in after another, will result in preventing, in the first instance, both slides being pushed to a functional position, or all but one slide being pushed to a functional position in the second instance. And it should here be borne in mind that the pawl 225, on rock-shaft 226, operates to lock a slide at substantially the extreme of its inward movement and thus prevent said slide from being withdrawn after the rod 34 has been tripped from its seat 35 to start the machine for a functional operation. Being so held, the coin-slide cannot be quickly withdrawn so as to permit the forcing in of a slide of another unit in an attempt to bring about an additional and greater feed movement for the purpose of obtaining an increased delivery from the machine. This pawl coöperating with the slide, as just described, also prevents the machine from being jammed by forcing two slides rearwardly in quick succession. It should also be noted that the length of the rod 221 is such that its pointed nose is entered between the balls practically at the beginning of the rearward movement of the coin-slide, the result of which is that, after a slide has been started to a functional position, it is impossible to start another in the same manner and said slide must be returned practically to its starting position before another can be started on a functional movement. In producing the gang-machine, it will be understood that it is only necessary to elongate the carrier and add the requisite number of balls to correspond with the units added to the machine.

From the foregoing description, it will be apparent that my machine automatically feeds and delivers articles in any desired quantity and under perfect and automatic control; that the control is, primarily, by the coin and, secondarily, by the train of mechanism intervening between the coin-slide and feeding mechanism; and that the feeding and delivery of articles is positive, accurate and predetermined.

Having thus described my invention what I claim and desire to secure by Letters Patent is:

1. A feeding mechanism for vending apparatus comprising an endless chain of links journaled together at intervals by pivot-pins extending beyond the links on opposite sides of the chain; driving means coöperating with the extensions of said pins for traversing the chain; and mechanism for actuating the driving means.

2. In a machine of the character described, the combination of a circularly moving device adapted to feed a ticket strip; means for severing said strip at the end of each feeding operation; a member adapted to actuate said feeding device; means for setting the severing means preparatory to its functional movement and at the same time moving said member into position preparatory to its actuating movement; and means for causing said member to drive said feeding device and, at the end of the feeding movement, to actuate the severing means to sever the strip.

3. A feeding mechanism for vending machines comprising a carrier having projections extending laterally therefrom; and means for actuating said carrier including a spring controlled device for engaging said projections to traverse the carrier.

4. A feeding mechanism for vending machines comprising a chain and sprocket mechanism; means carried by said mechanism for engaging the articles to be delivered; means for engaging the chain of said mechanism including a controlling device for varying the feed movement of said mechanism; and means for actuating the controlling means to cause delivery of articles according to predetermination.

5. A vending machine comprising delivery mechanism, including a weighted actuating device; means for controlling the initial position of said weighted device and setting the same in operation; and means for setting the controlling means in operation.

6. A feeding mechanism for vending machines comprising a device for engaging the articles to be delivered; a reciprocating spring-controlled device coöperating with said delivery device, and means between the two coöperating to produce a positive engagement for traversing the delivery device.

7. A feeding mechanism for vending machines comprising a chain formed of links pivoted together by pins, certain of said pins being extended a considerable distance on opposite sides of said links so as to provide a means for traversing the chain, and said pins and the links through which they extend having coöperating means which prevent said links and pins from having axial movement relatively.

8. A feeding mechanism for vending machines comprising a chain composed of links joined together periodically by pins having lateral extensions, said pins being provided with angular notches for receiving the edges of the joined links whereby axial movement of the pins and links relatively is prevented.

9. A feeding mechanism for vending machines comprising a chain composed of links joined together periodically by pins extending laterally in opposite directions from said links, said extensions of the pins being each provided with a pin arranged at a right-angle to it.

10. A feeding mechanism for vending machines comprising a flexible chain having extending from its side a plurality of projections, each projection being provided with a pin extending therefrom at a right-angle.

11. A feeding mechanism for vending machines comprising a chain having projections extending laterally therefrom, said projections being provided with pins angular in cross-section.

12. A feeding mechanism for vending machines comprising a flexible device for engaging the articles to be delivered; a chute for said articles comprising a support for the latter, said chute having beside the said support a longitudinal groove; and means coöperating with the articles to be delivered and extending into said groove whereby to bring about a positive engagement between the said articles and the delivery means.

13. A feeding mechanism for vending machines comprising a flexible device for engaging and feeding strips of articles to be delivered; a chute in which the strip of articles travels under the influence of the feeding device; and means for positively lifting the strip of articles to be delivered into engagement with the feeding device to secure the proper coöperative engagement between said device and said strip.

14. A feeding mechanism for vending machines comprising a flexible device for engaging the articles to be delivered; a chute for receiving the articles to be delivered having means for guiding said articles in their travel through the chute, and means carried by the flexible device, also coöperating with said guide to prevent said device from having lateral movement relatively to the chute.

15. A feeding mechanism for vending machines comprising a flexible carrier for engaging the articles to be delivered; guiding means for the articles to be delivered arranged in coöperative relation to the engaging means; means for imparting to the engaging means a movement of predetermined extent; and positive means coöperating with said engaging means to prevent the latter at any time during its operation, from having a retrograde movement.

16. A feeding mechanism for vending machines having, in combination, means for engaging the articles to be delivered; and means for actuating said engaging means including a reciprocating car provided with anti-friction devices, and tracks for said anti-friction devices.

17. A feeding mechanism for vending machines having, in combination, means for engaging the articles to be delivered; and means for actuating the engaging means including a reciprocating weighted device, means for positively moving said device in one direction, and means for permitting the movement of said device in the other direction.

18. A feeding mechanism for vending machines having, in combination, means for engaging the articles to be delivered; means for actuating the engaging means including a reciprocating device; means for actuating the reciprocating device including a rack and pinion; and means for restricting one of said last named devices to a single path of movement.

19. A feeding mechanism for vending machines having, in combination, means for engaging the articles to be delivered; means for actuating the engaging means to drive the same including a reciprocating member confined to operation in a single path, and a coöperating member having a rotary movement and a reciprocating movement toward and from the reciprocating member.

20. A feeding mechanism for vending machines including a flexible device for engaging the articles to be delivered; means for imparting movement to said flexible device including a weighted car provided with anti-friction rolls; tracks in which said rolls travel and are guided; means for moving said car in one direction partially carried by said car; and means for moving said car in opposite direction partially carried by said car.

21. A feeding mechanism for vending machines including means for engaging the articles to be delivered; and devices for actuating said engaging means including an inclined track; a car traveling thereon; yielding means carried by the car for coöperating with the engaging means; and means whereby the car is lifted in the track and then tripped into action.

22. A feeding mechanism for vending machines having, in combination, means for engaging the articles to be delivered; and means for actuating the engaging means including an inclined track; a weighted car traveling thereon; a rack-bar carried by the car; a tension-device engaging the rack-bar; a gear coöperating with the rack-bar; and means for disengaging the gear from the rack-bar to enable the tension-device to control the action of the car.

23. A feeding device for vending machines having, in combination, means for engaging the articles to be delivered; and means for coöperating with the engaging means including a spring-controlled device for moving the engaging means and a stop-device actuated by the spring-controlled device for stopping the action of the engaging-device.

24. A feeding mechanism for vending machines comprising, in combination, a flexible feeding device, means carried by said device for engaging the opposite edges of the articles to be delivered; and means for traversing the articles a predetermined distance.

25. A feeding mechanism for vending machines having, in combination, a reciprocatory car; a feed-chain; means carried by the car for engaging the chain; means for moving the car positively in one direction; and means for yieldingly moving the car in the opposite direction.

26. A vending machine having, in combination, a feeding mechanism comprising a feed-chain; a car coöperating with said chain and operating by gravity to move the same; means for positively moving the car in one direction; and means for tripping said car into action.

27. A vending machine, having, in combination, means for delivering articles therefrom in variable quantities; means for severing the articles at a single operation, regardless of the amount of delivery; mechanism for operating the delivery means; and means for actuating the severing means under control of the delivery means.

28. In a vending machine, the combination with a strip-guiding means; of a feeding device having means adapted to feed a strip through the machine; and means adapted to press said strip onto said guiding means and into engagement with the feeding device.

29. In a vending machine, the combination with a strip-guiding means; of a feeding device having means for feeding a strip through the machine, said means and device operating one above the other; and means adapted to yieldingly press said strip onto said guiding means and into engagement with the feeding device.

30. In a machine of the character described having an exit for tickets from a rolled ticket strip, the combination of a feeding device; a support whereon the ticket roll is revolubly mounted; pins borne by the feeding device adapted to coöperate with the ticket strip, thereby to feed the latter through the exit; means for actuating said feeding device; a pivotally supported member having a roller revolubly attached thereto, the latter being normally in engagement with the ticket strip between the roll and said feeding device; and a guiding means for holding the ticket strip in engagement with said roller.

31. In a ticket dispensing machine, the combination of a ticket delivering means; a reciprocating device adapted, when moving in one direction, to connect with and propel said delivering means; means for disengaging the device from said means at a predetermined time; and means engaged by said device and actuated thereby for severing the delivered ticket.

32. In a machine of the character described, the combination of a feeding device for feeding a ticket strip; a reciprocatory member adapted to actuate said device; and means for holding said member in operative relation with respect to said device only while said member is being restored to initial position.

33. In a machine of the character described, the combination of a circularly moving device adapted to feed a ticket strip; a reciprocatory member adapted to actuate said device; and means for holding said member in operative relation with respect to said device only while said member is being restored to initial position.

34. In a machine of the character described, the combination of a circularly moving device adapted to feed a ticket strip; means for severing the ticket strip at the end of each feeding operation; a reciprocatory member adapted to actuate said feeding device and also adapted to actuate said severing means; and means for holding said member in operative relation to said device only while said member is being restored to initial position and for actuating said severing means during said restoration.

35. In a machine of the character described, the combination of a circularly moving device adapted to feed a ticket strip; a reciprocatory member adapted to actuate said device; means for holding said member in operative relation to said device only while said member is being restored to initial position; and means actuated by said member for locking said device against movement at the completion of a feeding operation.

36. In combination with the delivery means of a vending machine, a holder for the articles to be delivered on which said articles are movable longitudinally, means for setting said articles in a fixed position on said holder, and means for locking the articles on said holder in said position.

37. In combination with the delivery mechanism of a vending machine, means for supporting a plurality of reels of articles to be delivered, means for locking the articles upon the holder, and means whereby, when one reel is exhausted, another can be supplied to the holder without disturbing the locking means.

38. In combination with the delivery mechanism of a vending machine, means for supporting the articles to be delivered, means for locking the articles upon the support, and means whereby other articles can be supplied to the support when the first set of articles has become exhausted without disturbing the locking means.

39. A vending machine having, in combination, means for delivering articles therefrom; a cutter for severing the articles at delivery; means whereby a part of the delivering means may trip the cutter into action; primary controlling means for controlling the operation of said delivering means; and secondary controlling means for coöperating with the articles to be delivered, including means whereby, in the absence of the articles to be delivered, the primary controlling means will be prevented from operating.

40. A vending machine having, in combination, feeding mechanism; cutting mechanism; and means whereby one may trip the other into action, said means including a device for cushioning the action of both mechanisms.

41. A cutting mechanism for vending machines comprising a reciprocatory cutting blade; positive means for driving said blade in one direction to set the same for action; yielding means for driving said blade in the opposite direction for a functional operation; and means whereby said blade may be locked in set position preliminary to the functional operation.

42. A feeding mechanism for vending machines comprising a carrier having projections extending laterally therefrom; means for actuating said carrier including a spring-controlled device for engaging said projections to traverse the carrier; and means whereby the movement of said spring-controlled device in one direction may be varied in order to vary the traverse of the carrier.

43. A feeding mechanism for vending machines comprising a carrier having projections extending laterally therefrom; means for actuating the carrier including a spring-controlled device for engaging said projections to traverse the carrier; means whereby the movement of said spring-controlled device in one direction may be varied in order to vary traverse of the carrier; and means for stopping the movement of said device invariably at the same point irrespective of its aforesaid variations.

44. A feeding mechanism for vending machines having, in combination, means for delivering articles therefrom; a cutting mechanism operating to sever the articles for delivery; and means coöperating with he cutting mechanism and the delivering means whereby the one is caused to trip the other into action.

45. A vending machine comprising means for advancing a ticket strip; means for operating the advancing means; means for subdividing the strip into tickets, said last mentioned means being normally disconnected from the advancing means; and means for operating the ticket subdividing means by the strip advancing means when a predetermined length of the strip reaches a given point in the machine.

46. A vending machine comprising means for advancing a ticket strip; mechanism for subdividing the strip into tickets, said subdividing mechanism being normally out of driving relation with the strip advancing means; and a device for placing said subdividing mechanism in coöperative relation with the advancing means when a predetermined portion of the ticket strip reaches a given point in the machine.

47. A vending machine comprising means for advancing a ticket strip; means for actuating the advancing means; mechanism for subdividing the strip into tickets, said subdividing mechanism being normally disconnected from the strip advancing means; and a device for automatically placing said subdividing mechanism in driven relation with said advancing means whenever a predetermined portion of the ticket strip reaches a given point in the machine.

48. A vending machine comprising means for advancing a ticket strip; a knife for cutting said strip into tickets; means for operating the knife, said operating means being normally disconnected from the strip advancing means; and means for operating the knife operating means by the strip advancing means, when a predetermined portion of the ticket strip reaches a given point in the machine.

49. A vending machine having therein a knife for cutting a strip into predetermined lengths; operating mechanism for the knife; means for advancing the strip toward the knife to position a predetermined portion of the strip in cutting alinement with the knife; and mechanism for automatically placing the knife operating mechanism in operative relation with the strip advancing means when a predetermined portion of the strip is in cutting alinement with the knife.

50. A vending machine comprising a knife for severing a strip into predetermined lengths; actuating mechanism for the knife; strip feeding means for advancing the strip to bring a predetermined portion thereof into cutting alinement with the knife; and means operating automatically to operate the knife cutting means through medium of the strip feeding means whenever a predetermined portion of the strip is brought into alinement with said knife.

51. A ticket vending machine having, in combination, a casing having a discharge slot; means for variably feeding a ticket strip through the discharge slot; means for normally blocking the discharge slot so as to prevent delivery or extraction of tickets; means for unblocking the slot preparatory to a delivery operation; and means for severing the ticket strip regardless of its length substantially at the delivery slot.

52. A machine of the character described having an exit for tickets from a ticket strip, comprising a feeding device provided with means adapted to engage said ticket strip for feeding the same through the exit; a knife for severing the issued tickets from the ticket strip in the machine and normally closing the exit; means for actuating the feeding device and adapted to move said knife away from the exit; means for returning said knife to its normal position; and a locking device for preventing the feeding device from operating until the exit has been unblocked by the knife.

53. A vending machine having, in combination, a feeding mechanism for delivering articles therefrom; a cutting mechanism for severing the articles; and means whereby the feeding mechanism may trip the cutting mechanism into action at the end of a feeding operation.

In testimony whereof I have hereunto signed my name in the presence of two subscribing witnesses.

ELIAS H. KELLEY.

Witnesses:
 CHAS. McC. CHAPMAN,
 M. E. HILLOCK.